United States Patent [19]

Pfeiffer

[11] Patent Number: 5,023,812

[45] Date of Patent: Jun. 11, 1991

[54] PRINTING WITH A LIMITATION OF LAYER THICKNESS AND OF TONAL-VALUE INCREASE

[75] Inventor: Nikolaus Pfeiffer, Heidelberg, Fed. Rep. of Germany

[73] Assignee: Heidelberger Druckmaschinen AG, Heidelberg, Fed. Rep. of Germany

[21] Appl. No.: 513,929

[22] Filed: Apr. 24, 1990

[30] Foreign Application Priority Data

Apr. 24, 1989 [DE] Fed. Rep. of Germany ....... 3913382

[51] Int. Cl.[5] .............................................. G06K 15/00

[52] U.S. Cl. ...................................... 364/519; 364/100

[58] Field of Search ................................ 364/518-520, 364/526, 550, 235 MS, 930 MS; 346/154; 250/226; 355/88, 326, 327; 101/DIG. 29

[56] References Cited

U.S. PATENT DOCUMENTS

| | | | |
|---|---|---|---|
| 4,390,958 | 6/1983 | Mamberer | 364/550 |
| 4,494,875 | 1/1985 | Schramm et al. | 364/519 |
| 4,535,413 | 8/1985 | Shiota et al. | 364/526 |

FOREIGN PATENT DOCUMENTS

| | | | |
|---|---|---|---|
| 1180285 | 1/1985 | Canada | 364/519 |
| 0228347 | 7/1987 | European Pat. Off. | 364/519 |
| 3741940 | 7/1988 | Fed. Rep. of Germany | 364/519 |
| 2198691 | 6/1988 | United Kingdom | 364/519 |

OTHER PUBLICATIONS

Publication FOGRA-Mitteilungen Nr. 120, pp. 1-6, Peter Kössler: "Tonwertzunahme im Mehrfarben-druck-Offsetdruck".

Publication Papier und Druck 31 (1982) 3, Druck und Verarbeitung, pp. 33-36; Lübbe: "Farbe, Farbmessung und Farbdichtmessung".

Publication BANKS: Advances in Printing Science and Technology, 16, Pentech Press London: Plymouth, 1982, pp. 97-120.

*Primary Examiner*—Arthur G. Evans

*Attorney, Agent, or Firm*—Herbert L. Lerner; Laurence A. Greenberg

[57] ABSTRACT

Control system for inking a printing press wherein a sheet printed by the printing press is measured photoelectrically in a plurality of test areas and thus-obtained measured values are processed in conjunction with setpoint values to form control data, based upon which the inking of the printing press is controlled, which comprises computing a tonal-valve increase at an actual locus and at a setpoint locus from at least one measured value of a half-tone field and of a full-tone field of a printed sheet; if the tonal-value increase at the setpoint locus is not a tolerable tonal-value increase, determining corresponding tolerance limits of ink layer thickness for a maximum and a minimum tolerable tonal-value increase; with the ink layer thickness, computing a possible locus at the limit of the tolerable tonal-value increase as a new setpoint locus, and triggering the setpoint locus, if it is additionally within a color tolerance and density tolerance, respectively.

13 Claims, 4 Drawing Sheets

PRINTING WITH A LIMITATION OF LAYER THICKNESS AND OF TONAL-VALUE INCREASE

BACKGROUND OF THE INVENTION

The invention relates to an electronic system for controlling the inking of a printing press and, more particularly, such a system wherein a sheet printed by the printing press is measured photoelectrically in a number of test areas, the measured values obtained thereby are processed in conjunction with setpoint values to form control data, and the inking of the printing press is controlled in accordance with the control data.

Control of inking in the course of a printing process represents the most important possibility for influencing the inking and, thereby, the impression of the image. The aim of inking control is to achieve as good a color agreement as possible between an original and a printed image in a production run. The control of inking in accordance with colorimetric quantities is regarded as a considerable improvement in this connection, because feedback control, in the sense of matching the setpoint values and actual values of a color locus, corresponds to a good approximation to color perception by the human eye.

Spectral measurements of the diffuse reflection of color-measuring fields, the mathematical conversion of these measured values into colorimetric quantities and further into control data for adjusting the inking elements of a printing press have become known herero-fore. In European Published Non-Prosecuted Application (EP-OS) 0 228 347, there is disclosed, in addition to a suitably equipped printing press and a measuring device for such a printing press, a method of controlling the inking of a printing press. For color matching an original and a printed image in a production run, the spectral diffuse reflection is measured in color-measuring fields which are also printed by the printing press, and corresponding color coordinates are determined therefrom. By a comparison with the setpoint diffuse reflection and the setpoint color coordinates, respectively, the distance between the setpoint and actual color loci is calculated and is converted into changes in the thicknesses of the layers of the printing inks. The inking elements are controlled in accordance with these calculated changes of the layer thicknesses of the individual printing inks in such a manner that the total distance between the actual and setpoint color loci in the corresponding color space is minimized.

In the published non-prosecuted patent application 89 100 150.6 of the People's Republic of China, there is likewise proposed a process for controlling the inking of a printing press on a colorimetric basis, the process being distinguished by its high speed of convergence, i.e. its rapid detection of the relative distance between the actual and setpoint color loci.

Although colorimetric control conforms with the color perception of the human eye, the quality of inking control in both processes is limited by the fact that no attention is paid to technical process-related limits inherent in offset printing. Once calculated, a setpoint color locus remains the setpoint color locus throughout the entire printing process and is triggered or selected even if this involves the exceeding of or not reaching, respectively, a maximum or minimum allowable layer thicknesses of one or more printing inks. By the maximum or minimum allowable layer thickness there is meant, in this connection, the layer thickness at which the accompanying increase in the size of the half-tone dots of a printing ink leads to impermisible tonal values. These changes in the tonal-value increase of the printed image in a production run lead to shifting of the color locus, which is reflected in color distortions which are not tolerable, particularly in the range of critical shades of color (e.g. skin shades). German Published Non-Prosecuted Patent Application (DE-OS) 38 12 099.2 proposes a process which, based upon colorimetric control and taking into account the parameter of a maximum thickness of the layer of individual printing inks, permits a considerably more reliable and, thereby, extensively automatic control of the inking of a printing press.

If, when triggered or selected directly, the setpoint color locus can be attained only if this were to involve exceeding the maximum thickness of a printing-ink layer, then, proceeding from this color locus at the maximum thickness of the printing-ink layer, tests are made as to whether, by changing the thicknesses of the layers of other printing inks, it is possible to obtain a color locus that lies within the specified tolerances about the setpoint color locus. If this were to yield a color locus which involve the exceeding of the maximum thickness of a second printing-ink layer, then, proceeding from this color locus, an attempt is made, by changing the remaining printing ink, once again to find a color locus which lies within the specified tolerances about the setpoint color locus. As soon as a color locus is found, by means of the successive process steps, which lies within the maximum allowable layer thicknesses of all of the printing inks involved in the printing job, this color locus is triggered or selected as the new setpoint color locus. If no success is had in obtaining a color locus within the tolerance range about the setpoint color locus without exceeding the maximum layer thickness of at least one printing ink, provision is made for performing a manual intervention into the control process. Armed with his expert knowledge, the printer is able to decide whether to extend the tolerance range about the setpoint color locus or whether to increase the maximum layer thickness of the critical printing ink. Once the appropriate decision has been made, the afore-described process starts afresh and, subject to the parameter of maximum layer thicknesses, again seeks for a color locus situated as close as possible to the setpoint color locus.

Although this method of inking control takes into account the fact that, in order to achieve optimum agreement between original and printed image in a production run, it is not permissible to exceed the maximum layer thicknesses of the individual printing inks, it is disadvantageous, in this connection, to assume that the selected maximum layer thickness is to be constant throughout the entire printing process. No account is taken of process-dependent changes in the maximum layer thickness, for example, due to changes in the consistency of the printing inks under the influence of temperature or humidity, due to soiling of the rubber blanket or due to changes in the paper.

Moreover, it is more advantageous for the optimum control of inking if the tonal-value increase is taken into account directly and not indirectly, i.e. via the maximum/minimum layer thickness. The tonal-value increase, defined as the difference of the screen tonal values (percentage of optically active area coverages) of screened film and screen print, is of decisive imporance for the color impression of a printed image in a production run, as noted hereinbefore. Even minor changes in the area coverage of the screen of only one color lead to non-tolerable color distortions in the case of high-grade printed products.

With regard to the tonal-value increase, the German Published Non-Prosecuted Application 38 12 099.2 merely provides that, if a specified tolerance range of the tonal-value increase is exceeded, a warning signal is given; the inking control itself is not thereby influenced. In order, however, to achieve optimum print quality and to obtain extensively automatic control of inking, it is not permissible to exceed maximum allowable changes in the tonal-value increase or to exceed limits, derived therefrom, for the maximum allowable layer-thickness tolerances and, in the color space, for the color tolerances, respectively.

SUMMARY OF THE INVENTION

It is accordingly an object of the invention, therefore, to provide a system for controlling the inking of a printing press, wherein, taking into account limits of technical processing, an optimum print quality is assured and, extensively automatic control of the inking is permitted. Manual intervention on the part of the printer need take place only in extreme, exceptional cases.

With the foregoing and other objects in view, there is provided, in accordance with the invention a control system for inking a printing press wherein a sheet printed by the printing press is measured photoelectrically in a plurality of test areas and thus-obtained measured values are processed in conjunction with setpoint values to form control data, based upon which the inking of the printing press is controlled, which comprises computing a tonal-value increase at an actual locus and at a setpoint locus from at least one measured value of a half-tone field and of a full-tone field of a printed sheet; if the tonal-value increase at the setpoint locus is not a tolerable tonal-value increase, determining corresponding tolerance limits of ink layer thickness for a maximum and a minimum tolerable tonal-value increase; with the ink layer thickness, computing a possible locus at the limit of the tolerable tonal-value increase as a new setpoint locus, and triggering the setpoint locus, if it is additionally within a color tolerance and density tolerance, respectively.

In accordance with another feature of the control system according to the invention, if the new setpoint locus is not within the color tolerance and the density tolerance, respectively, the system includes enlarging the tonal-value increase tolerance by a factor N, and triggering a possible locus at the limit of the color tolerance and density tolerance, respectively, as a setpoint locus if it is additionally within the enlarged, tolerable tonal-value increase.

In accordance with a further aspect of the invention, there is provided a control system for inking a printing press wherein a sheet printed by the printing press is measured photoelectrically in a plurality of test areas and thus-obtained measured values are processed in conjunction with setpoint values to form control data, based upon which the inking of the printing press is controlled, which comprises computing tonal-value increases at an actual locus and at a setpoint locus from grey-field, full-tone and half-tone measured values of a printed sheet; if at least one tonal-value increase at the setpoint locus is not within tolerable tonal-value increases, determining corresponding tolerance limits of ink layer thicknesses of the printing inks being used for maximum and minimum tolerable tonal-value increases; with the ink layer thicknesses, computing a possible locus within the limits of the tolerable tonal-value increases as a new setpoint locus if it is additionally within a tolerance space.

Similarly as for single-color control, in accordance with an added feature of the invention as applied to multi-color control, if the new setpoint locus is not within the tolerance space, the control system includes enlarging the tonal-value increase tolerances by a factor N, and determining a possible locus within the limits of the enlarged, tolerable tonal-value increase.

In accordance with an additional feature of the invention, the control system includes triggering an "optimum" locus at a point of intersection of a straight connecting line between the possible loci with the surface of the tolerance space as a setpoint locus, if appertaining tonal-value increases are within the enlarged, tolerable tonal-value increases. This additional feature of the control system according to the invention ensures that the setpoint locus which is triggered or selected is as close as possible to the exact setpoint locus.

In accordance with other alternate features of the control system, measured values from grey-field and half-tone and full-tone fields can be determined both by means of a spectrometer and also by means of a densitometer.

In accordance with yet another feature of the invention, the control system includes inputting the factor N for enlarging the tonal-value increase tolerance about the setpoint locus.

In accordance with yet a further feature of the invention, the control system includes inputting a further course of action with reference to a decision-making list, if no suitable locus is found which is both within respective regular and enlarged, tolerable tonal-value increases and additionally within corresponding color tolerances and density tolerances, respectively.

This makes it possible for the printer, in extreme, exceptional cases, to intervene into the control of inking. For example, he can decide which of the following decisions will provide as good a printed product as possible:

1. Change in the setpoint tonal-value increase of a specific printing ink.
2. Change in the tonal-value-increase tolerance of a specific printing ink.
3. Change in the color tolerance or density tolerance of a specific printing ink.
4. Select the setpoint locus in spite of greatly excessive tonal-value increase in a specific ink.
5. Select the setpoint locus if it is within the tonal-value increase tolerance, but not within the color tolerance or density tolerance of a printing ink.

This decision-making list is intended for single-color control. In the case of grey-field control, the printer additionally has the possibility of deciding for which color the respective change is to be made.

In accordance with a concomitant feature of the invention, the control system includes computing and displaying to the printer at least one suggestion for enlarging at least one color tolerance and density tolerance, respectively, at least one tonal-value increase tolerance and the setpoint tonal-value increase. This provides the printer with specific information on the color changes he should expect when he takes his choice of action. The printer thus has the opportunity, based upon the values displayed and in conjunction with his experience, to find an optimum inking without running the risk of printing waste due to unsuccessful correction attempts.

Other features which are considered as characteristic for the invention are set forth in the appended claims.

Although the invention is illustrated and described herein as embodied in an electronic control system for inking a printing press with a limitation of layer thickness and of tonal-value increase, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DETAILED DESCRIPTION OF THE INVENTION

Figure 1:
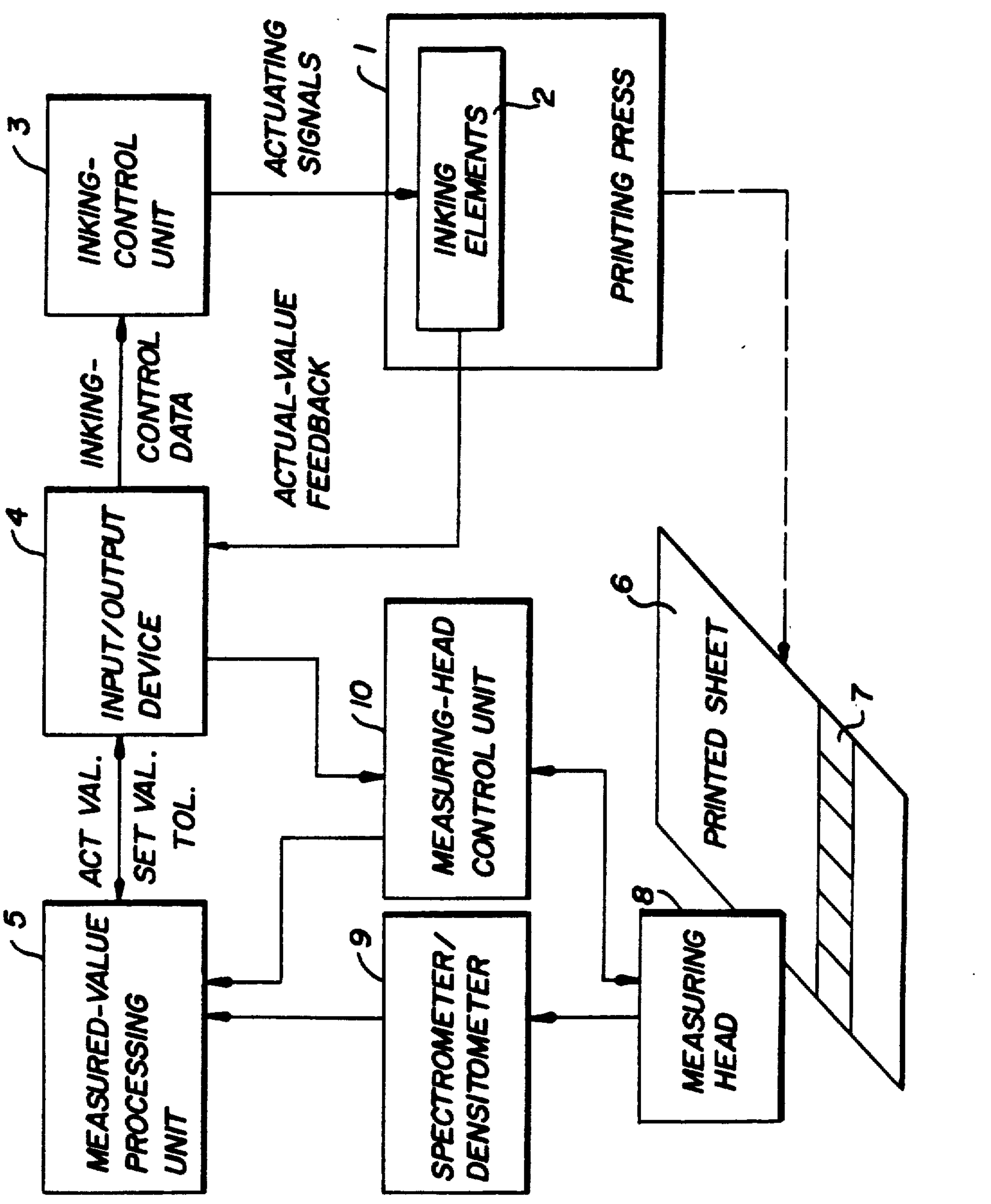
FIG. 1 is a block diagram of the control system according to the invention.

Referring now to the drawing and, first, particularly to FIG. 1 thereof, there is shown therein a printing press 1 conventionally provided with inking elements 2, by means of which a supply of ink and thus a layer thickness thereof are controllable by actuating signals. These actuating signals are transmitted to the inking elements 2 from an inking-control unit 3, which produces the actuating signals in accordance with inking-control data generated in an input/output device 4 in conjunction with a measured-value processing unit 5. From the inking elements 2, an actual-value feedback to the input/output unit 4 is provided.

A sheet 6 printed by the printed press is provided with a print-checking strip 7 having a plurality of color-measuring fields. The latter are scanned by a measuring head 8 forming part of a densitometer or spectrometer 9. An electronic measuring-head control unit 10 controls the position of the measuring head 8, wherein an actual position of the measuring head 8 can be relayed to the measuring-head control unit 10 and further to the measured-value processing unit 5. From the densitometer/spectrometer 9, measured values are sent to the measured-value processing unit 5.

By employing the method according to the invention as described in greater detail hereinafter, the apparatus of the control system shown in FIG. 1 ensures control, and markedly regulation, respectively, of the layer thicknesses in the sense of optimizing color reproduction. In this connection, when corrections are to be made, which necessitate a weighing of various quality parameters, the printer is provided with suggestions, via the input/output device 4, which he may modify or follow by a suitable input.

Figure 2:
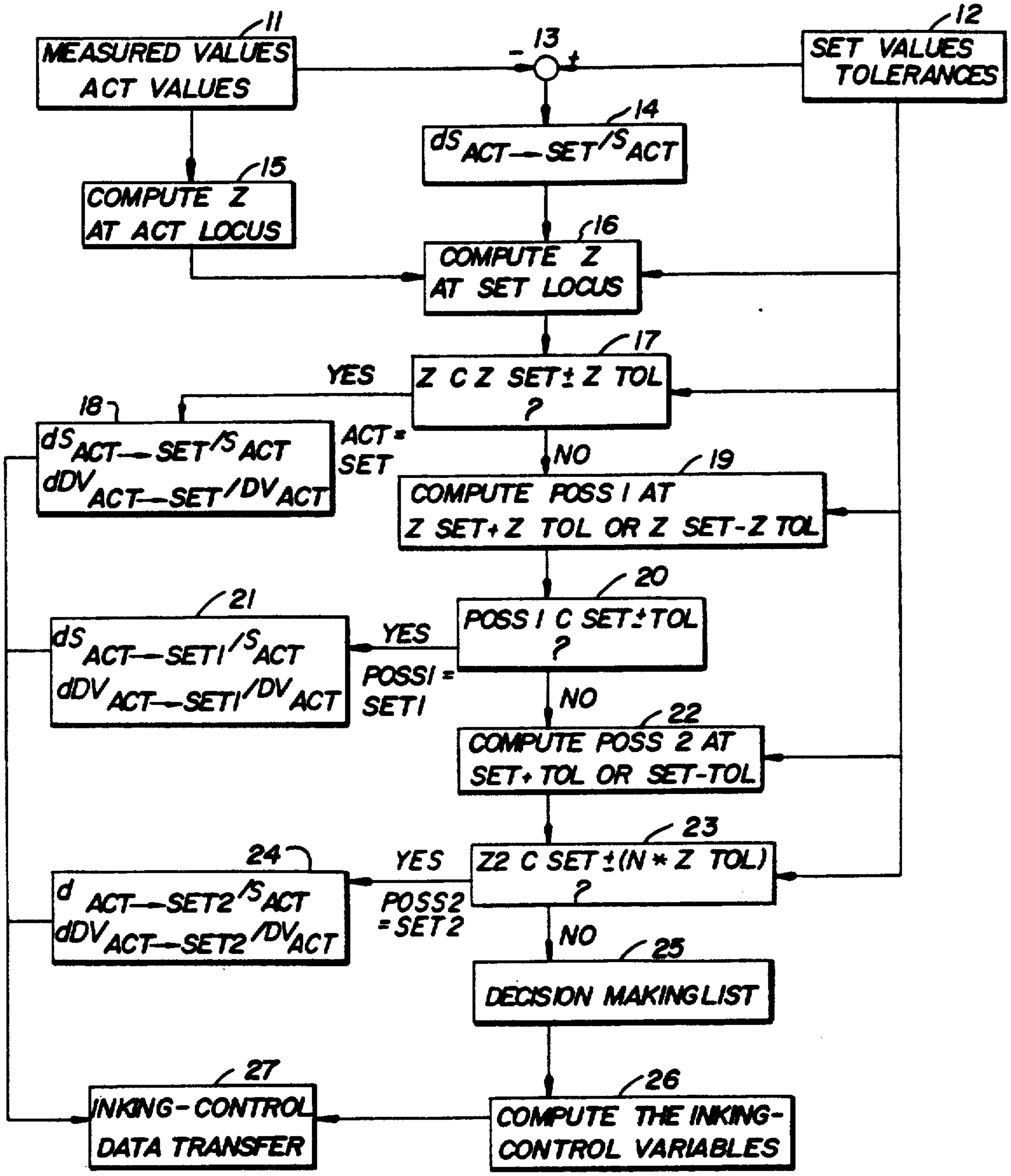
FIG. 2 is a flow diagram for inking control in single-color fields, in accordance with one aspect of the invention.

The flow chart of FIG. 2 illustrates a special mode of the control method for the case of single-color control. Single-color control is suitable for single-color printing or for printing of special inks.

According to the flow diagram of FIG. 2, the measured values from the spectrometer or densitometer 9, i.e. the actual values, are obtained at 11 At 12, the setpoint values and the respective tolerances are retrieved from a memory. By means of a subtraction at 12, the difference between the measured value and the setpoint value for each printing ink is obtained. Then, the relative layer-thickness change dS/S and density change dDV/DV, respectively, needed to match the actual value and the setpoint value is calculated at 14 for each printing ink.

In the flow-chart part 15, a tonal-value increase $Z_i$ at the actual locus is computed and, therefrom, e.g. by means of a so-called "light-capture model" which has become known from the Chinese Published, Non-Prosecuted Application 89 100 150.6 based on the as-yet unpublished Swiss patent application 01 268/88-9, the tonal-value increase Z at the setpoint locus SET is determined at 16 by way of approximation. If the calculated tonal-value increase Z at the setpoint locus SET is within the tonal-value increase tolerance ZTOL about the setpoint tonal-value increase ZSET, which is checked at 17, the relative layer-thickness changes dS/S and density change dDV/DV, respectively, for matching the actual value ACT and the setpoint value SET are calculated at 18. This inking-control data is sent directly to an inking-control unit 3 via the inking-control data transfer 27.

If the calculated tonal-value increase Z at the setpoint locus SET is not, however, within the tolerable tonal-value increase ZSET±ZTOL of the corresponding printing ink at 17, then the color locus and density locus POSS1, respectively, at the limit of the tonal-value increase tolerance Z+ZTOL is calculated at 19. If this locus POSS1 is additionally within the color tolerance ETOL and density tolerance DVTOL, respectively, about the setpoint locus SET, which is checked in flow-chart part 20, it becomes the new setpoint locus SET1. The change in layer thickness, calculated at 21, for matching the actual locus ACT and the setpoint locus SET1 is transmitted to the inking-control data transfer 27.

If the possible locus POSS1 fails to satisfy the additional condition that it should lie within the color tolerance ETOL and density tolerance DVTOL, respectively, then a possible locus POSS2 at the color-tolerance limit and density-tolerance limit, respectively, is computed at 22. If the tonal-value increase is within the extended limit of the tonal-value increase tolerance N×ZTOL, which is tested at 23, then the layer-thickness change dS/S and density change dDV/DV, respectively, for matching the actual value ACT and the setpoint value SET2 is computed at 24 and is transmitted to the inking-control data transfer 27.

Should the possible locus POSS2 at the color-tolerance limit and density-tolerance limit, respectively, not be within the extended tonal-value increase tolerance N×ZTOL, the hereinaforementioned possibilities for a further course of action are presented to the printer for him to make his choice. In flow-chart part 25, on the basis of suggestions and on the basis of his experience, the printer is able to decide, with reference to a deciion-making list, on the further course of action to be aken by him via the input/output device 2. A computation of the inking-control variables is performed at 26 in accordance with the input provided by the user and is ransmitted via the inking-control data transfer 27 to the nking-control unit 3.

Figure 3:
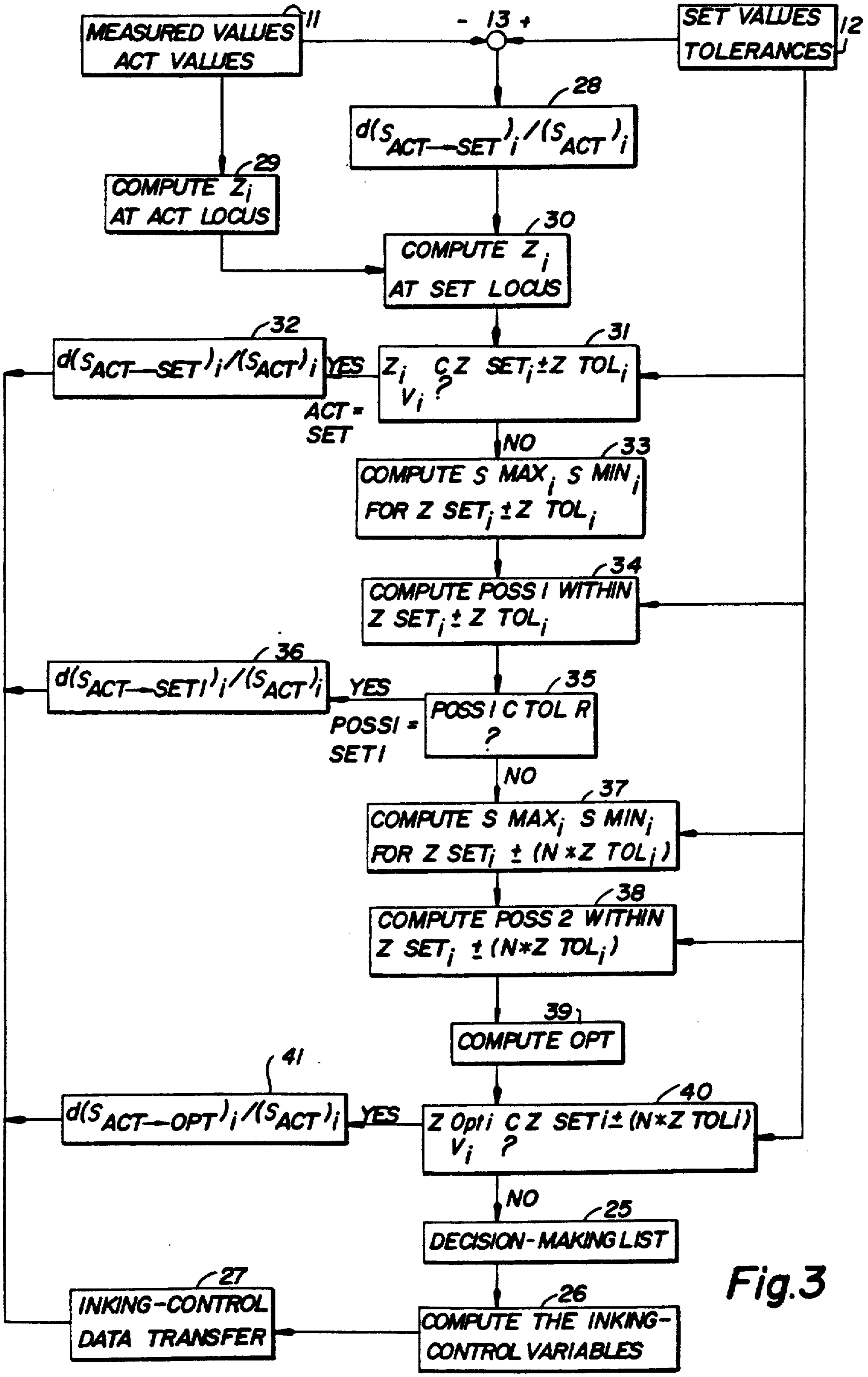
FIG. 3 is a flow diagram for colorimetric inking control in multi-color fields (grey fields), in accordance with the invention.

In FIG. 3, there is provided a flow diagram for implementing the control method according to the invention for the case of colorimetric inking control in grey fields. Grey-field control is suitable if printing is being performed with the three standard colors CYAN, MAGENTA and YELLOW. In the case of density control, the densities are then checked independently of one another to determine whether they are within the allowable tolerances (note the single-color control).

In a manner similar to that described hereinbefore with reference to FIG. 2, the measured values from the spectrometer 9, i.e. the actual values, are obtained at 11. At 12, the setpoint values and the tolerances are retrieved from a memory. By means of a subtraction at 13, the difference is formed between the measured values and the corresponding setpoint values. Then, the relative layer-thickness change $dS_i/S_i$ required for attaining the setpoint values is computed at 28. In this regard and hereinafter, the index or subscript i represents the standard inks involved in the printing process. Indexed variables are determined independently of one another for each of the three printing inks.

The tonal-value increase $Z_i$ at the actual locus is determined in flow-chart part 29. It is then possible therefrom, e.g. by means of the so-called "light capture model" which has become known heretofore from the hereinaforementioned Chinese published patent application, to determine the tonal-value increase $Z_i$ at the setpoint locus SET by way of approximation at 30. A check is made at 31 as to whether this approximatively computed tonal-value increase $Z_i$ at the setpoint locus SET is within a specified tonal-value increase tolerance $ZTOL_i$ about the setpoint tonal-value increase. If this condition is satisfied for each of the printing inks, the layer-thickness change $dS_i/S_i$, previously determined at 28, is transmitted via the program part 32 to the inking-control data transfer 27.

If one of the printing inks fails to comply with this condition, the maximum allowable layer thicknesses $Smax_i$ and $Smin_i$ are computed at 33 for the associated maximum and minimum tolerable tonal-value increases $ZSET_i \pm ZTOL_i$. For colorimetric measurements, using the process for inking control known from the aforementioned German published patent application (DE-OS) 38 12 099.2 and taking into account the "layer-thickness limitation", a possible locus POSS1 is determined at 34, at which the layer of each printing ink is within its maximum allowable thickness.

If the new possible locus POSS1 is within the tolerance, which is checked at 35, the possible locus POSS1 becomes the new setpoint locus SET1 and the layer-thickness change $dS_i/S_i$, computed at 36, needed to match the actual locus ACT and the setpoint locus SET1 is transmitted to the inking-control data transfer 27.

If the possible locus POSS1 is not within the tolerances, the tonal-value increase tolerance $ZTOL_i$, is extended or enlarged at 37 by a factor N ($N > 1$) and the maximum tolerable limits $Smax'_i$ and $Smin'_i$ for the layer thickness are determined from the corresponding extended or enlarged limits of the tonal-value increase tolerances $ZSET_i \pm (N \times ZTOL_i)$. Then, in flow-chart part 38, the possible locus POSS2 is determined at which none of the maximum allowable layer thicknesses $Smax_i$ is exceeded.

The optimum color locus OPT is determined at 39. This optimum color locus OPT is at the point of intersection of the straight connecting line between POSS1 and POSS2 with the surface of the tolerance space TOLR. A check is performed at 40 whether the tonal-value increase $ZOPT_i$ belonging to the optimum locus OPT is within the extended tonal-value increase tolerance $(ZTOL_i)ext$ about the setpoint tonal-value increase ZSET. If this condition is satisfied for all printing inks, OPT becomes the new setpoint locus SET2 and the corresponding layer-thickness changes $dS_i/S_i$ are determined at 41 and are sent to the inking-control data transfer 27.

On the other hand, if both conditions cannot be satisfied simultaneously, the automatic control of inking is abandoned in the continuing course of the method according to the invention. With reference to a decision-making list 25, the printer is able to input a further course of action. The corresponding inking-control variables are computed at 42 and are transmitted to the inking-control data transfer 27.

Besides control regulation by color loci and density loci, respectively, this method additionally takes into account the fact that, in order to achieve good color reproduction, it is not permissible, for reasons relating to technical processing, for certain limits of the tonal-value increase and of the layer thickness to be exceeded or not reached. If it is not possible to find a locus in compliance with the simple parameters, the limits for the parameters are extended or enlarged. Only when this, too, fails to find a suitable color locus and density locus, respectively, does it become necessary for the printer to intervene manually into the control of inking.

Figure 4:
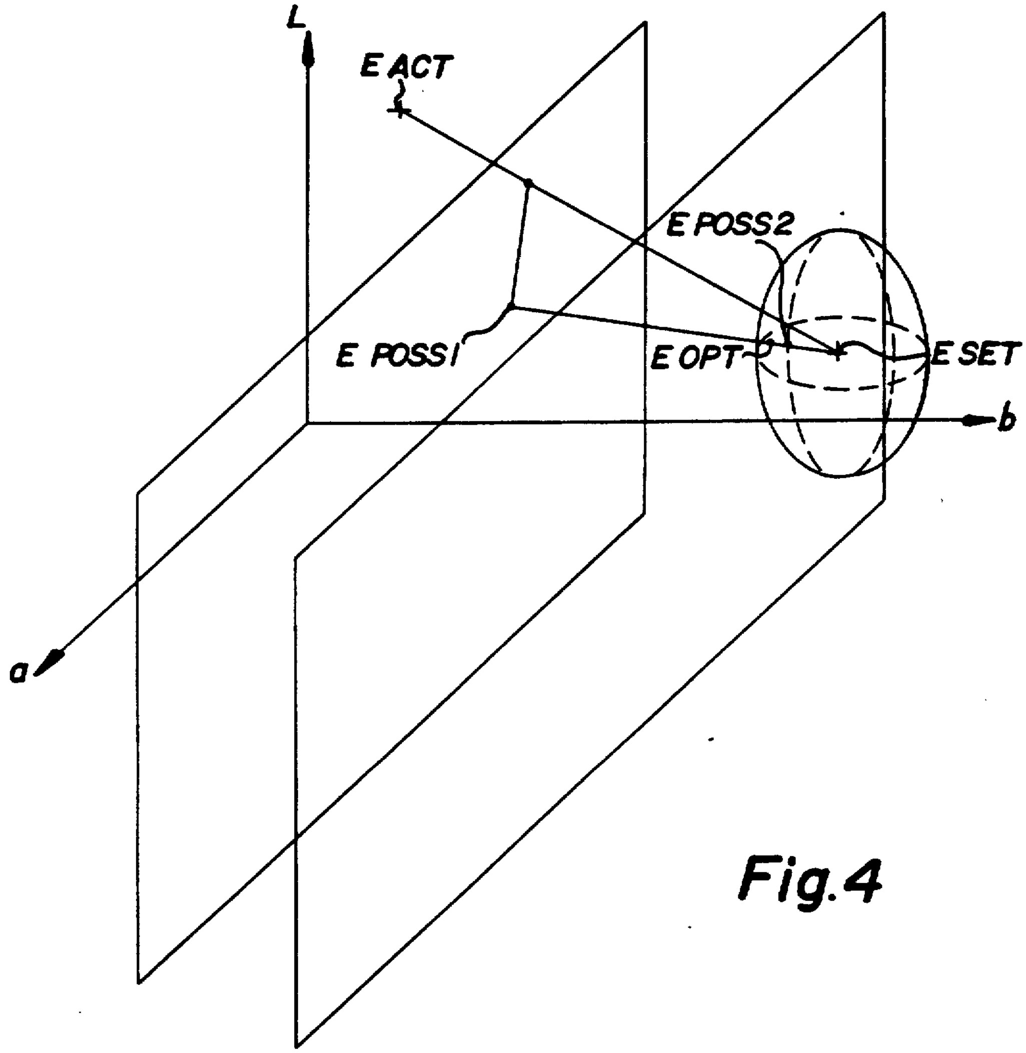
FIG. 4 is a three-dimensional graph in the color space representing the method of operation of the control system according to the invention.

In order to elucidate the flow diagram shown in FIG. 3, FIG. 4 illustrates the individual method steps with reference to a graph in the color space (L-, a-, b-space).

The actual color locus EACT and the setpoint color locus ESET are separated from one another by a given distance. The setpoint color locus ESET is then unconditionally triggered or selected. If all tonal-value increases at the setpoint locus are not within the tolerances, a check is made initially as to whether it is possible to find a possible color locus EPOSS1 within specified tonal-value increase tolerances, and thus within maximum layer thicknesses $Smax_i$, $Smin_i$ of the individual printing inks computed therefrom, with the possible color locus EPOSS1 additionally lying within the specified color-tolerance space ETOLR about the setpoint color locus ESET. Plotted in FIG. 4 without loss in generality is the maximum tolerable tonal-value increase for only a first printing ink. The boundary or limiting surface is spanned by the two remaining printing inks. In the general form, not illustrated in FIG. 4, however, the tonal-value-increase tolerances $ZTOL_i$ form a parallelepiped as a space about the actual color locus EACT.

Sketched in FIG. 4 is a case wherein the possible color locus EPOSS1 is not within the color-tolerance space ETOLR spanned by the color tolerances $ETOL_i$. This color-tolerance space ETOLR has the advantageous form of an ellipsoid, the longer axis of which lies in the direction of the L-axis. This takes into account the fact that the human eye reacts considerably less sensitively to changes in brightness than to changes in color. Because the possible color locus EPOSS1 does not simultaneously satisfy both conditions (maximum layer thickness and maximum color tolerance), the possible color locus EPOSS1 does not become the new setpoint color locus ESET1.

Quite to the contrary, the tonal-value increase tolerance is extended by a factor N (N>1), and a further possible color locus EPOSS2 within the extended tonal-value increase is determined. As shown, this possible color locus EPOSS2 satisfies the additional condition and lies within the color-tolerance ellipsoid about the setpoint color locus ESET. Because it is less advantageous to trigger or select a color locus EPOSS2 at the limit of the previously extended or enlarged tonal-value increase for "optimum" inking control, however, the point of intersection of the straight connecting line between the two possible color loci EPOSS1 and EPOSS2 with the surface of the tolcrance ellipsoid is determined as the new setpoint color locus EOPT. The tonal-value increase at EOPT is within the extended, tolerable tonal-value increase. EOPT is therefore triggered or selected as the new setpoint locus.

The foregoing is a description corresponding in substance to German Application P 39 13 382.6, dated Apr. 24, 1989, the International priority of which is being claimed for the instant application, and which is hereby made part of this application. Any material discrepancies between the foregoing specification and the aforementioned corresponding German application are to be resolved in favor of the latter.

I claim:

1. Control system for inking a printing press wherein a sheet printed by the printing press is measured photoelectrically in a plurality of test areas and thus-obtained measured values are processed in conjunction with setpoint values to form control data, based upon which the inking of the printing press is controlled, which comprises computing a tonal-value increase (Z) at an actual locus (ACT) and at a setpoint locus (SET) from at least one measured value of a half-tone field and of a full-tone field of a printed sheet; if the tonal-value increase (Z) at the setpoint locus (SET) is not a tolerable tonal-value increase (ZSET±ZTOL), determining corresponding tolerance limits of ink layer thickness (Smax, Smin) for a maximum and a minimum tolerable tonal-value increase (ZSET+ZTOL and ZSET—-ZTOL); with the ink layer thickness (Smax, Smin), computing a possible locus (POSS1) at the limit of the tolerable tonal-value increase (ZSET+ZTOL and ZSET−ZTOL, respectively) as a new setpoint locus (SET1), and triggering the setpoint locus (SET1), if it is additionally within a color tolerance (ETOL) and density tolerance (DVTOL), respectively.

2. Control system according to claim 1, wherein, if the new setpoint locus (SET1) is not within the color tolerance (ETOL) and the density tolerance (DVTOL), respectively, enlarging the tonal-value increase tolerance (ZTOL) by a factor N (N>1), and triggering a possible locus (POSS2) at the limit of the color tolerance (ETOL) and density tolerance (DVTOL), respectively, as a setpoint locus (SET2) if it is additionally within the enlarged, tolerable tonal-value increase {ZSET±(N×ZTOL)}.

3. Control system for inking a printing press wherein a sheet printed by the printing press is measured photoelectrically in a plurality of test areas and thus-obtained measured values are processed in conjunction with setpoint values to form control data, based upon which the inking of the printing press is controlled, which comprises computing tonal-value increases ($Z_i$) at an actual locus (ACT) and at a setpoint locus (SET) from grey-field, full-tone and half-tone measured values of a printed sheet; if at least one tonal-value increase ($Z_i$) at the setpoint locus (SET) is not within tolerable tonal-value increases ($ZSET_i \pm ZTOL_i$), determining corresponding tolerance limits of ink layer thicknesses ($Smax_i$, $Smin_i$) of the printing inks being used for maximum and minimum tolerable tonal-value increases ($ZSET_i + ZTOL_i$ and $ZSET_i - ZTOL_i$); with the ink layer thicknesses ($Smax_i$, $Smin_i$), computing a possible locus (POSS1) within the limits of the tolerable tonal-value increases ($ZSET_i + ZTOL_i$ and $ZSET_i - ZTOL_i$, respectively) as a new setpoint locus (SET1) if it is additionally within a tolerance space (TOLR).

4. Control system according to claim 3, wherein, if the new setpoint locus (SET1) is not within the tolerance space (TOLR), enlarging the tonal-value increase tolerances ($ZTOL_i$) by a factor N (N>1), and determining a possible locus (POSS2) within the limits of the enlarged, tolerable tonal-value increase $\{ZSET_i \pm (N \times ZTOL_i)\}$.

5. Control system according to claim 4, which includes triggering an "optimum" locus (OPT) at a point of intersection of a straight connecting line between the possible loci (POSS1 and POSS2) with the surface of the tolerance space (TOLR) as a setpoint locus (SET2), if appertaining tonal-value increases ($ZOPT_i$) are within the enlarged, tolerable tonal-value increases $\{ZSET_i \pm (N \times ZTOL_i)\}$.

6. Control system according to claim 1, which includes measuring ink density of a half-tone and a full-tone field of a printed sheet with a densitometer for determining the measured value.

7. Control system according to claim 1 which includes measuring diffuse reflection of a half-tone and a full-tone field of a printed sheet with a spectrometer for determining the measured value.

8. Control system according to claim 2, which includes inputting the factor N for enlarging the tonal-value increase tolerance (ZTOL) about the setpoint locus (SET).

9. Control system according to claim 5, which includes inputting a further course of action with reference to a decision-making list, if no suitable locus (SET1, SET2 or OPT) is found which is both within respective regular and enlarged, tolerable tonal-value increases (ZTOL and N×ZTOL, respectively, and $ZTOL_i$ and $N \times TZOL_i$, respectively) and additionally within corresponding color tolerances ($ETOL_{(i)}$) and density tolerances ($DVTOL_{(i)}$), respectively.

10. Control system according to claim 9, which includes computing and displaying to the printer at least one suggestion for enlarging at least one color tolerance ($ETOL_{(i)}$) and density tolerance ($DVTOL_{(i)}$), respectively, at least one tonal-value increase tolerance ($ZTOL_{(i)}$) and the setpoint tonal-value increase ($ZSET_{(i)}$).

11. Control system according to claim 3, which includes measuring ink density of a half-tone and a full-tone field of a printed sheet with a densitometer for determining the measured values.

12. Control system according to claim 3, which includes measuring diffuse reflection of a half-tone and a full-tone field of a printed sheet with a spectrometer for determining the measured values.

13. Control system according to claim 4, which includes inputting the factor N for enlarging the tonal-value increase tolerances ($ZTOL_i$) about the setpoint locus (SET).

* * * * *